R. E. MEHARRY.
CORN HARVESTER.
APPLICATION FILED MAR. 15, 1916.
1,256,347.
Patented Feb. 12, 1918.
4 SHEETS—SHEET 1.
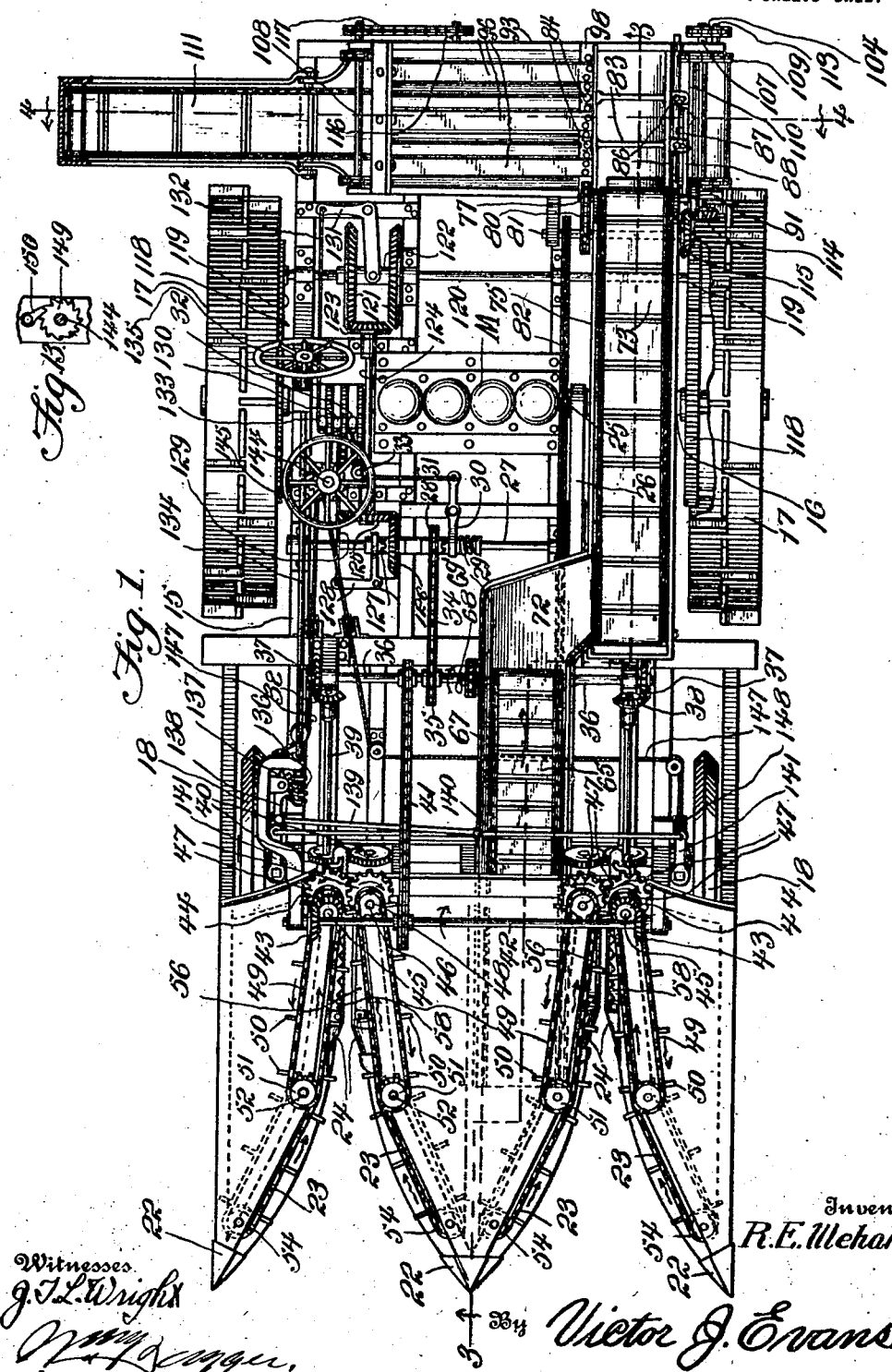

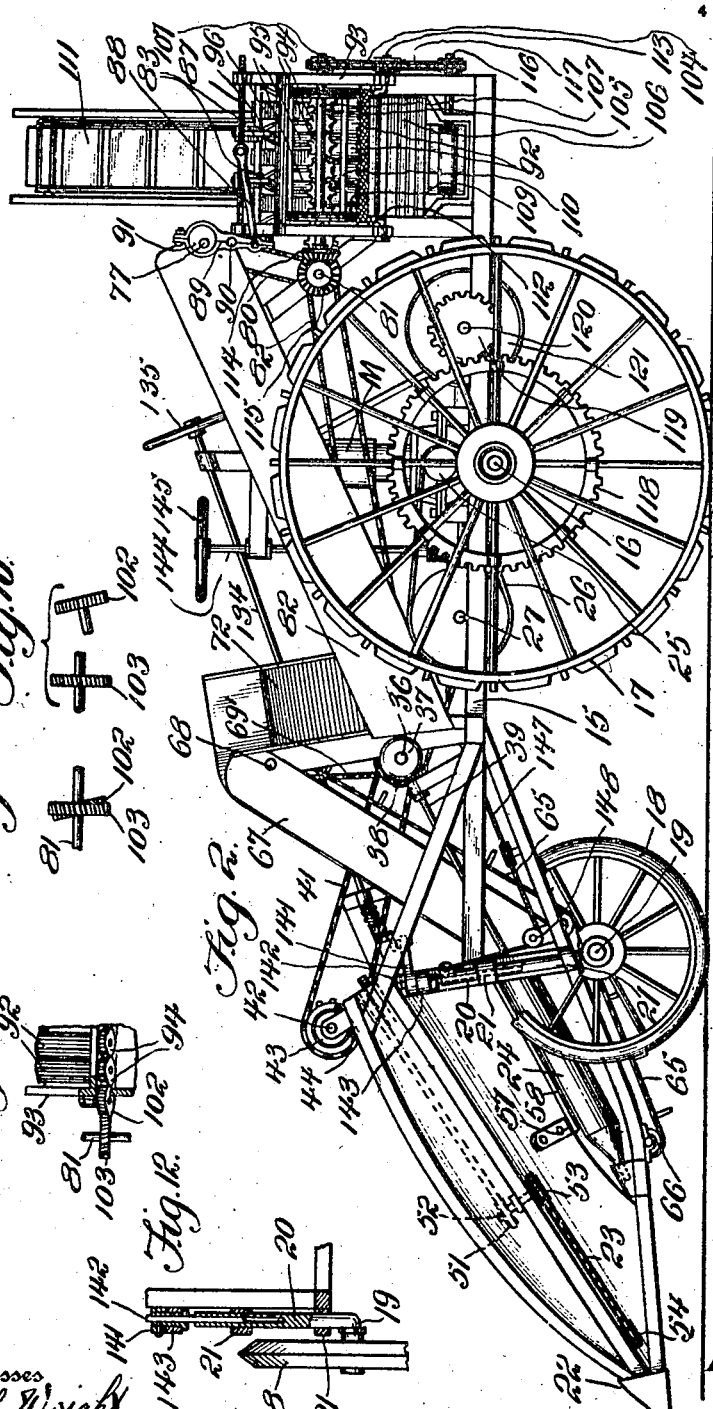

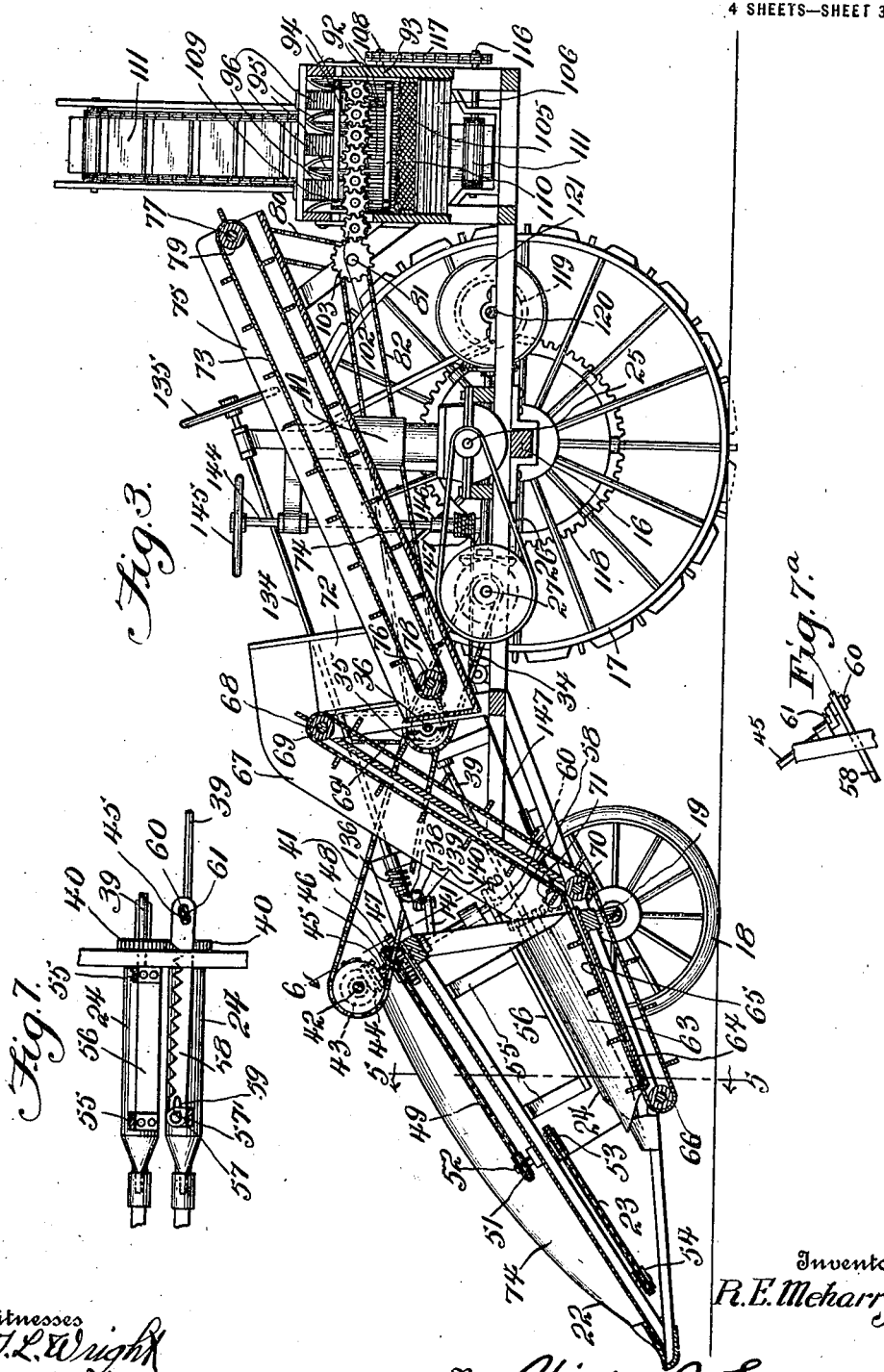

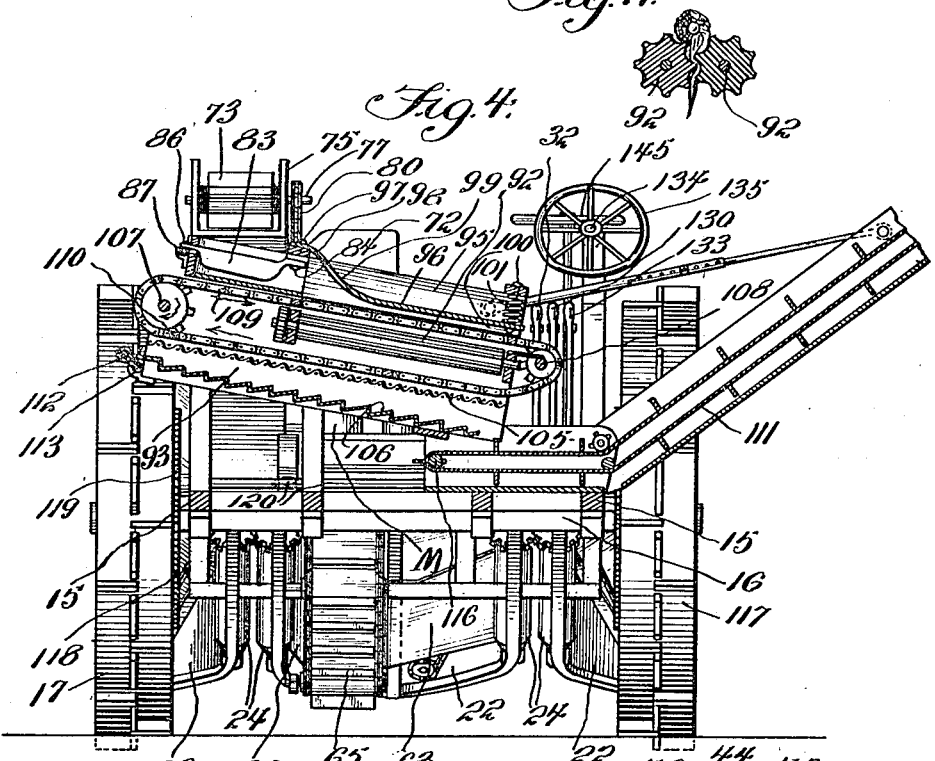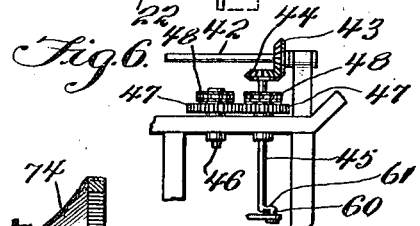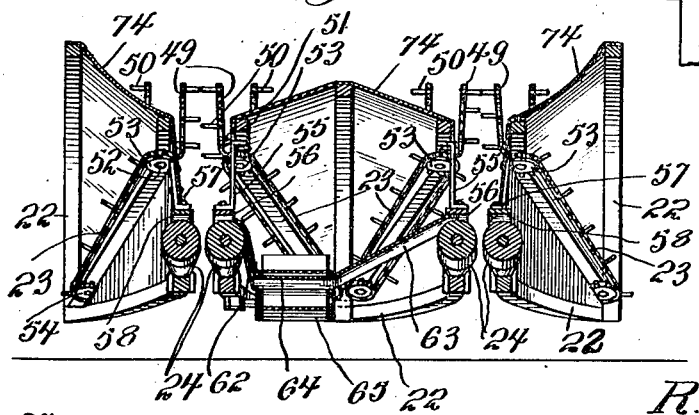

UNITED STATES PATENT OFFICE.

ROBERT E. MEHARRY, OF COLFAX, ILLINOIS.

CORN-HARVESTER.

1,256,347.  Specification of Letters Patent.  Patented Feb. 12, 1918.

Application filed March 15, 1916. Serial No. 84,376.

*To all whom it may concern:*

Be it known that I, ROBERT E. MEHARRY, a citizen of the United States, residing at Colfax, in the county of McLean and State of Illinois, have invented new and useful Improvements in Corn-Harvesters, of which the following is a specification.

This invention relates to corn harvesters, and it has particular reference to that type of corn harvesting machines whereby the ears are snapped from the stalks while the latter are standing in the field.

The invention has for its object to produce a simple and effective machine of the type referred to which will be self propelling, and in which the ears that are detached from the stalks will be conveyed to a husking mechanism by means of which the husks are detached before the ears are conveyed to a receptacle such as the box of a wagon that may travel alongside of the harvesting machine.

A further object of the invention is to provide simple and effective means for saving such grains as may become detached from the ears during the husking process.

With those and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a top plan view of a machine constructed in accordance with the invention.

Fig. 2 is a side elevation of the same.

Fig. 3 is a longitudinal sectional view taken on the line 3—3 in Fig. 1.

Fig. 4 is a transverse sectional view taken on the line 4—4 in Fig. 1.

Fig. 5 is a transverse sectional detail view taken on the line 5—5 in Fig. 3.

Fig. 6 is a sectional detail view taken on the line 6—6 of Fig. 3.

Fig. 7 is a detail plan view of a set of snapping rolls and related parts.

Fig. 7ª is a detail view of some of the parts shown in Fig. 7.

Figs. 8, 9 and 10 are detail views of the means employed for transmitting motion to the husking mechanism.

Fig. 11 is a transverse sectional view of a pair of husking rolls.

Fig. 12 is a detail view partly in section showing a supporting means for one of the steering wheels.

Fig. 13 is a detail plan view showing the pawl and ratchet coöperating with the shaft 144, the latter being shown in section.

Corresponding parts in the several figures of the drawings are denoted by like characters of reference.

The main frame of the machine includes side members or sills 15 supported on an axle 16 having ground wheels 17. The forward portion of the frame is supported on the front wheels or steering wheels 18, the same being mounted on spindles 19 at the lower ends of upright rods 20 which are guided in lugs or ears 21 on the sides of the frame, the rods 20 being slidable and revoluble with respect to the lugs. Means to be hereinafter described will be provided for raising and lowering the frame with respect to the upright rods 20.

The machine illustrated in the drawings is adapted to operate on two rows of corn, and the forward end of the frame is provided with divergent gathering arms or members 22 adapted to receive between them the rows of corn stalks, the same being guided by endless chains 23 in the direction of the snapping rolls 24 which are arranged in pairs, as shown, said snapping rolls being conically pointed at their forward ends, as is customary.

Mounted on the main frame of the machine is a motor M which may be an internal combustion motor of any well known type, said motor having a main driven shaft 25 from which motion is transmitted by a chain or belt 26 to a counter shaft 27. The counter shaft 27 carries a sprocket wheel 28 which is adapted to be connected with said shaft for rotation therewith by means of a spring actuated clutch 29 operable by a shipping lever 30 which is connected by a flexible element 31 with a hand lever 32, said flexible element being guided over a pulley 33. The sprocket wheel 28 is connected by a chain 34 with a sprocket wheel 35 on a transversely disposed shaft 36 which is provided at the ends thereof with bevel gears 37 meshing with bevel gears 38 on shafts 39, one shaft 39 being connected with a snapping roll 24 of each set for the purpose of driving the same. The snapping rolls composing each set are provided with intermeshing gears 40.

From the shaft 36 motion is transmitted by a chain 41 to a counter shaft 42 which is supported above the snapping rolls and from which motion is transmitted by intermeshing bevel gears 43, 44 to a pair of shafts 45, said shafts 45 being each mounted for rotation in a vertical plane substantially at right angles to the shaft 42, and the upper ends of said shafts 45 being forwardly inclined, as will be clearly seen by reference to Fig. 3. The shafts 45 are connected with similar shafts 46 disposed in parallel relation thereto by means of intermeshing gears 47, the shafts 46 being thus rotated oppositely to the shafts 45. The shafts 45, 46 are each provided with sprocket wheels 48 over which the stalk elevating chains 49 are guided, the links of said chains being provided at suitable intervals with fingers 50. The forward portions of the elevating chains 49 are guided over sprocket wheels 51 on shafts 52, best seen in Fig. 3, said shafts being also provided with sprocket wheels 53 over which the gathering chains 23 are trained, the forward portions of said gathering chains being guided over idlers 54.

Brackets 55 are provided above and adjacent to the snapping rolls of each pair for the purpose of supporting blades 56, one such blade being supported longitudinally above and adjacent to one snapping roll of each pair. Lugs or brackets 57 are also provided with which are movably connected the forward ends of serrated bars or blades 58 that extend longitudinally above and adjacent to the other roll of each pair, each of said pivoted blades being provided with a slot 59 engaging the pivot member 57' whereby said blade is connected with the bracket 57. The rearward end of each blade 58 engages the wrist portion 60 of a crank 61, said cranks being formed at the lower ends of the shafts 45. It will be seen that the cranks 61 serve to impart vibratory and longitudinally slidable motion to the blades 58 which coöperate with the blades 56 to snap or sever the stems whereby the ears are attached to the stalks. The longitudinally slidable movement of the blades 58 in connection with the vibratory movement of said blades will also serve to assist in feeding the stalks of each hill rearwardly between the snapping rolls, avoiding their being hung up between said rolls and the possibility of thus obstructing the stalks of the next hill to be operated upon. It has been found in practice that when the snapping rolls are permitted to operate directly on the ears of corn, a large number of kernels are liable to become detached from the ear and lost on the ground, being previously mashed by passing between the snapping rolls, thus involving a loss which in the aggregate becomes very considerable. By the coacting snapping plates 56 and 58 it is found that the stems will be severed before the ears themselves pass in contact with the snapping rolls, the main function of the latter being to pull or buckle the stalks downwardly. Loss of grain at this stage will thus be avoided.

The ears that are detached from the stalks are guided over inclined planes or chutes 62, 63 to a conveyer trough 64 wherein operates the lower forward portion of an endless conveyer 65, the forward portion of said conveyer being guided over an idle roller 66. The conveyer trough 64 has an upwardly inclined rearward portion 67 near the upper end of which a short transverse shaft 68 is supported for rotation, said shaft carrying a roller 69 over which the upper rearward portion of the conveyer 65 is trained, and said shaft being driven by a transmission chain 69 from the shaft 36. The lower lead of the conveyer 65 is guided over a roller 70 which is located at the angle between the portions 64 and 67 of the conveyer trough, and the top lead of the conveyer is engaged by idlers one of which may be seen at 71, the purpose of said idlers being to maintain the top lead of the conveyer in the angle portion of the trough, so that ears of corn will be first carried over the gradual incline of the forward portion of the conveyer and subsequently over the steep rearward portion of the conveyer until the top is reached when the ears will be discharged over a chute 72 on a secondary conveyer 73. The lower portion of the conveyer 65, as well as the snapping rolls and related parts, are housed or guarded by plates 74 of sheet metal or other suitable material to avoid possibility of ears being dropped on the ground after being detached from the stalks.

The secondary conveyer 73 is mounted for operation in a trough or casing 75, said trough being upwardly and rearwardly inclined and provided at its lower and upper ends with bearings for shafts 76, 77 carrying rollers 78, 79 over which the conveyer is trained. The roller carrying shaft 77 at the upper rearward end of the trough is connected by a driving chain 80 with shaft 81 which is driven by means of a transmission chain 82 from the counter shaft 36 from which motion is thus imparted to the secondary conveyer.

Over the tail end of the conveyer 73 the ears of corn are discharged on a grate, the bars of which 83, best seen in Figs. 1 and 4, are disposed transversely with respect to the main frame of the machine, said bars having their inner ends pivoted, as seen at 84, on a stationary frame bar 98, while the outer ends of said grate bars are pivotally connected at 86 with a movable bar 87 to which reciprocatory movement is imparted by means of a pitman 88 connecting said reciprocatory bar with one end of a rocking member 89 which is fulcrumed at 90, see Fig. 2, and which is actuated by means of a cam 91 from the shaft 77. Most of the ears that are elevated by means of the conveyers 65 and 73 are apt to be disposed lengthwise with respect to the frame of the machine. The purpose of the rocking grate bars 83 is to turn such of the ears as are lengthwise disposed until they are disposed lengthwise with respect to the rolls of the husking mechanism, said rolls being arranged transversely with respect to the frame, as will be presently seen.

The husking rolls 92, of which any desired number may be used, are mounted for rotation in a casing or housing 93 at the tail end of the machine, the axes of said rolls being disposed in substantially parallel relation to the shafts over which the conveyers 65 and 73 are trained, thus positioning the said husking rolls transversely with respect to the main frame of the machine. All the husking rolls are connected together by intermeshing gears 94 in a manner which is well known in machines of this class, and guide bars or rods of triangular cross section are mounted above the rolls so as to guide the ears to the interspaces between coacting rolls. The individual husking rolls may be longitudinally grooved, as will be best seen in the detail view Fig. 11, but husking rolls of any well known and approved construction may be employed. The husking rolls are disposed in an inclined plane, as will be clearly seen in Fig. 4, said rolls being inclined downwardly toward one side of the main frame of the machine. Presser bars 96 consisting of resilient metal strips are secured at 97 on the frame bar 98, said presser bars having off-sets 99 by means of which the ears of corn may readily pass from the grate bars in the direction of the opposite ends of the presser bars which are movably supported by pins or studs 100 carrying springs 101, whereby the lower ends of the presser bars are forced in the direction of the husking rolls, thereby exerting on the ears of corn passing beneath said presser bars a degree of pressure which will insure the husks being engaged by the husking rolls so as to be stripped or detached from the ears.

The husking rolls receive motion from the shaft 81 through the medium of an idle pinion 102 which meshes on the one hand with the pinion 94 of one of the husking rolls and on the other hand with a pinion 103 of special construction carried by the shaft 81, said pinion having obliquely disposed teeth so as to properly mesh with the teeth of the idler 102, which latter is obliquely disposed to correspond with the slant of the husking rolls. The special construction of the transmission means just described will be clearly understood by reference to Figs. 8, 9 and 10.

Supported beneath the husking rolls is a sieve or screen 105 and a reciprocatory fishback conveyer 106, the sieve 105 permitting the passage of grains or kernels that become detached from the ears in the husking process to the conveyer 106, while the husks will drop on the sieve 105. Supported for rotation adjacent to the upper and lower ends of the husking rolls are shafts 107, 108 over which an endless conveyer or drag 109 is trained, said drag being equipped with transverse slats 110. The upper lead of this drag serves to move the ears from which the husks have been detached in the direction of the lower ends of the husking rolls over which such ears are discharged on an elevator 111. The lower lead of the drag serves to move the husks over the surface of the screen or sieve 105 and to discharge the husks over the upper edge of said screen at one side of the main frame of the machine. The upper end of the conveyer 106 is supported by the crank 112 of a shaft 113 driven by a chain 104 from the shaft 107, the latter having a bevel gear 114 that meshes with a bevel gear 115 on the shaft 81 from which motion will thus be transmitted to the fishback conveyer.

The elevator 111, which is of angular shape, as clearly seen in Fig. 4, is trained over suitable guides and shafts, one of which, 116, receives motion from the shaft 108 by a transmission chain 117.

For the purpose of propelling the machine over the field the ground wheels 17 are equipped with spur wheels 118, the same meshing with pinions 119 on a shaft 120, said shaft carrying reversing mechanism comprising two opposed bevel gears 121 which are mounted on a slidable hub 122, and either one of which may be placed in mesh with a bevel pinion 123 on one end of a longitudinally disposed shaft 124, the other end of which carries a bevel gear 125 meshing with a bevel gear 126 on the counter shaft 27, said bevel gear 126 being revoluble on said shaft 27 with which it may be connected for rotation by a clutch 127 which may be thrown in or out of gear with respect to the bevel gear 126 by means of a bell crank 128 which is connected by a rod 129 with a hand lever 130, whereby the motion transmission means may be thrown in and out of gear. The hub 122 carrying the reversing gears 121 may be moved longitudinally of the shaft 120 by means of a bell crank 131 which is connected by a rod 132 with a hand lever 133, thus permitting the motion to be reversed when desired.

A steering gear is provided, the same including a steering rod 134 having a hand wheel 135 whereby it may be rotated. The rod 134 has a worm 136 meshing with a gear 137 having a radial arm 138 which is connected by a rod 139 with a bar 140, whereby cranks 141 are connected together, said cranks being mounted on rods 142 of square or non-circular cross section, said rods being slidable in sockets formed for their reception in the upright rods 20 having the spindles 19 on which the steering wheels 18 are supported. It will be readily seen that when the cranks 141 are turned or manipulated, the upright rods carrying the wheels will be correspondingly turned, thereby steering the machine in the desired direction.

Lugs or brackets 143 are mounted on the frame of the machine beneath the cranks 141 for the purpose of supporting the said cranks as well as the rods 142 at a constant elevation with respect to the frame of the machine, the forward end of said frame being vertically adjustable.

For the purpose of effecting vertical adjustment of the forward end of the machine a drum shaft 144 is provided, said drum shaft having a hand wheel 145 and a drum 146 on which may be wound a flexible element 147, one end of which is connected with the upper end of one of the upright rods 20 having the spindles 19 on which the front wheels are mounted. The flexible element is guided over a pulley 148 mounted for rotation on the frame of the machine near the lower edge thereof so that by winding the flexible element 147 on the drum, the frame will be lifted, the non-circular rods 142 sliding upwardly in the sockets of the rods 20 so that, by lifting or adjusting the front end of the machine, the steering mechanism will not be disconnected or thrown out of gear. Reverse rotation of the drum shaft 144 is prevented by a ratchet wheel 149 on said steering rod, the same being engaged by a dog or pawl 150 on the frame of the machine.

From the foregoing description, taken in connection with the drawings hereto annexed, the operation and advantages of this invention will be readily understood by those skilled in the art to which it appertains. As the machine advances over the field, the corn stalks will be guided between the snapping rolls, and the ears will be detached from the stalks by the conjoint action of the snapping rolls and the blades 56, 58, one of which is movably supported so as to assist in snapping or breaking the stems whereby the ears are connected with the stalks. The stalks are pulled downwardly below the frame of the machine which passes over them. The ears are conveyed by the conveying devices 65 and 73 to the husking device, where the said ears are deposited on the grate having the movably supported bars 83, and whereby the ears are straightened out to a longitudinal position with respect to the husking rolls. The ears now are carried by the drag or conveyer 109 over the husking rolls and beneath the presser bars 96 whereby the ears are forced into engagement with the husking rolls. After being deprived of the husks the ears are discharged over the lower end of the drag 96 upon the elevator 111. The husks which drop on the sieve 105 are dragged in the opposite direction and dropped on the ground at the side of the machine. Detached grains or kernels pass through the sieve 105 to the fishback conveyer 106 and are deposited on the elevator 111 whereby, together with the husked ears, said grains are conveyed to a convenient receptacle which may consist of the box or body of a wagon which is driven alongside of the harvesting machine.

It will thus be seen that by the improved machine corn may be harvested and husked in a simple, economical and labor saving manner, without danger of losing any valuable parts and at a single operation.

Having thus described the invention, what is claimed as new, is:—

1. In a corn harvester, a device for snapping or detaching ears from corn stalks, the same including a pair of rolls between which a corn stalk is guided and whereby it is pulled downwardly, a stationary blade mounted above and adjacent to one of the rolls, a bracket supported above and adjacent to the other roll, a guide pin on said bracket, a movable blade having a slot engaging the guide pin, and a driven shaft having a crank engaging the movable blade to impart thereto a vibratory and also a longitudinal motion.

2. In a corn harvester, a device for snapping or detaching ears from corn stalks, the same including a pair of rolls between which a corn stalk is guided and whereby it is pulled downwardly, a stationary blade mounted above and adjacent to one of the rolls, a bracket supported above and adjacent to the other roll, a guide pin on said bracket, a movable blade having a slot engaging the guide pin, and a driven shaft having a crank engaging the movable blade to impart thereto a vibratory and also a longitudinal motion, said movable blade having a serrated edge facing the stationary blade and operating to impart a feed movement to the stalks.

In testimony whereof I affix my signature in presence of two witnesses.

ROBERT E. MEHARRY.

Witnesses:
 Roy Barnes,
 B. T. Jones.